No. 656,545.

G. HOOKHAM.
ELECTRICITY METER.
(Application filed July 9, 1900.)

(No Model.)

Patented Aug. 21, 1900.

5 Sheets—Sheet 1.

No. 656,545. Patented Aug. 21, 1900.
G. HOOKHAM.
ELECTRICITY METER.
(Application filed July 9, 1900.)

(No Model.) 5 Sheets—Sheet 2.

Attest,
Wm. F. Hall.

Inventor
George Hookham
by Ellis Spear
Atty.

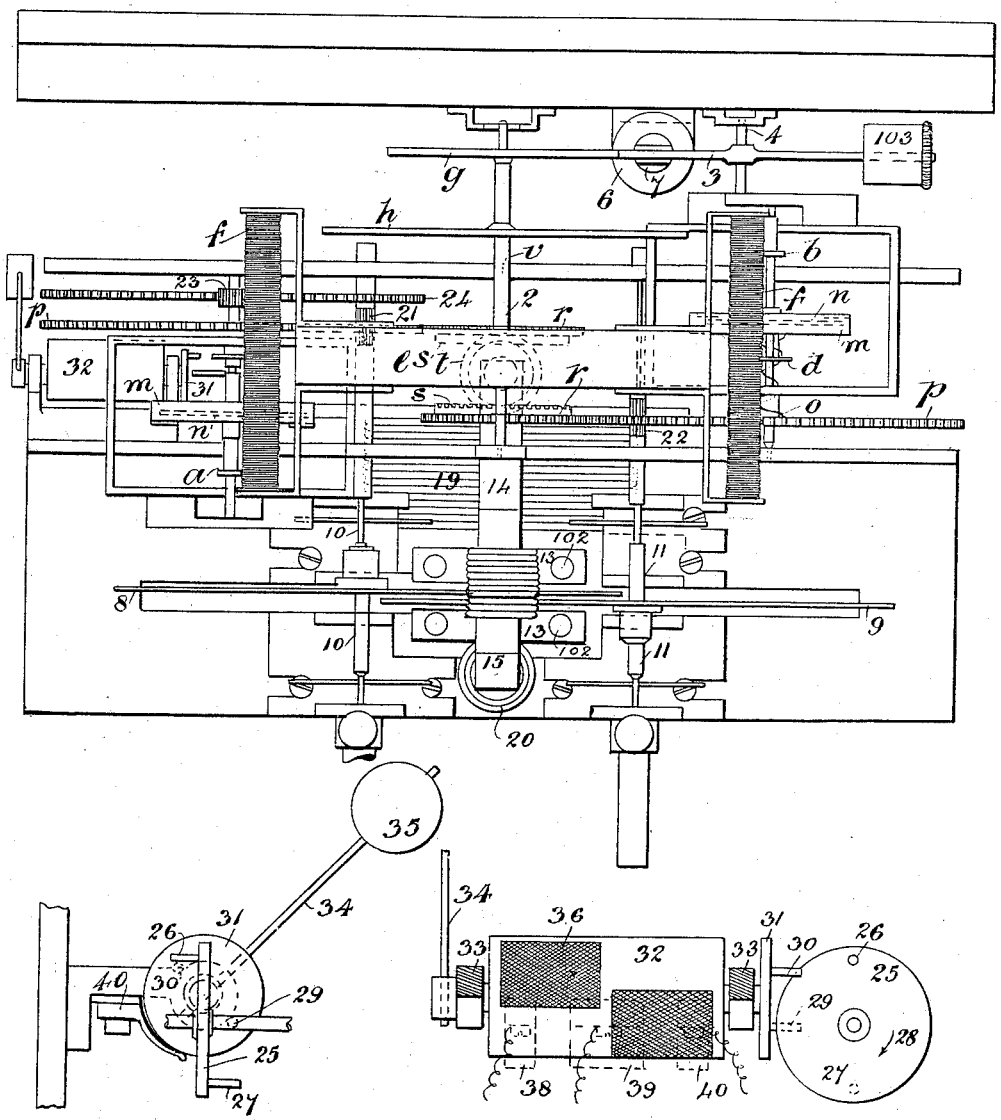

No. 656,545. Patented Aug. 21, 1900.
G. HOOKHAM.
ELECTRICITY METER.
(Application filed July 9, 1900.)

(No Model.) 5 Sheets—Sheet 4.

Attest
Wm. F. Hall
F. L. Middleton

Inventor
George Hookham
by [signature] Atty.

No. 656,545. Patented Aug. 21, 1900.
G. HOOKHAM.
ELECTRICITY METER.
(Application filed July 9, 1900.)

(No Model.) 5 Sheets—Sheet 5.

UNITED STATES PATENT OFFICE.

GEORGE HOOKHAM, OF BIRMINGHAM, ENGLAND.

ELECTRICITY-METER.

SPECIFICATION forming part of Letters Patent No. 656,545, dated August 21, 1900.

Application filed July 9, 1900. Serial No. 23,027. (No model.)

*To all whom it may concern:*

Be it known that I, GEORGE HOOKHAM, electrical engineer, a subject of the Queen of Great Britain and Ireland, and a resident of 4 New Bartholomew street, in the city of Birmingham, England, have invented a certain new and useful Improvement in Electricity-Meters, (for which I have made application for Letters Patent in Great Britain, No. 17,159, bearing date August 24, 1899,) of which the following is a specification.

My improvements apply principally to that class of meters in which the deviations from normal time produced in a pendulum affected by the electric current (or energy) to be metered are registered. The rate of such a pendulum is generally compared with that of an unaffected pendulum, and it is essential to accurate registration that when no current is passing the two pendulums should synchronize. This condition has been found very difficult to realize, and the principal object of the present invention is to secure such synchronism.

My invention consists in automatically synchronizing two pendulums by means of a beam or balance gear at periodic intervals in an electricity-meter, in which registration is effected by deviations from normal time produced in one pendulum by the current or energy to be measured, neither pendulum being affected by the current to be measured during the said periodic intervals.

It further consists in apparatus adapted to effect this synchronization.

Figure 1:
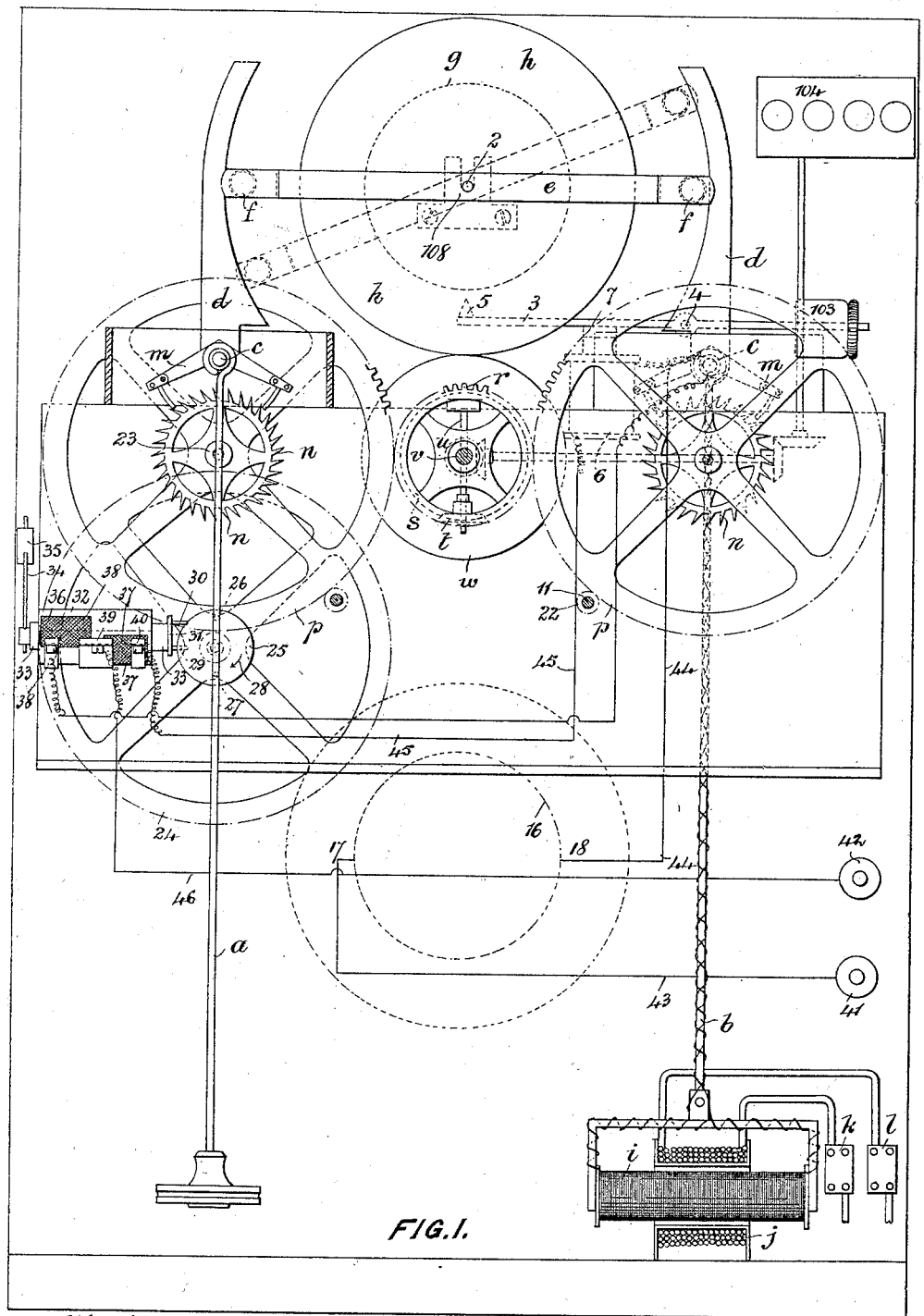
Figure 2:
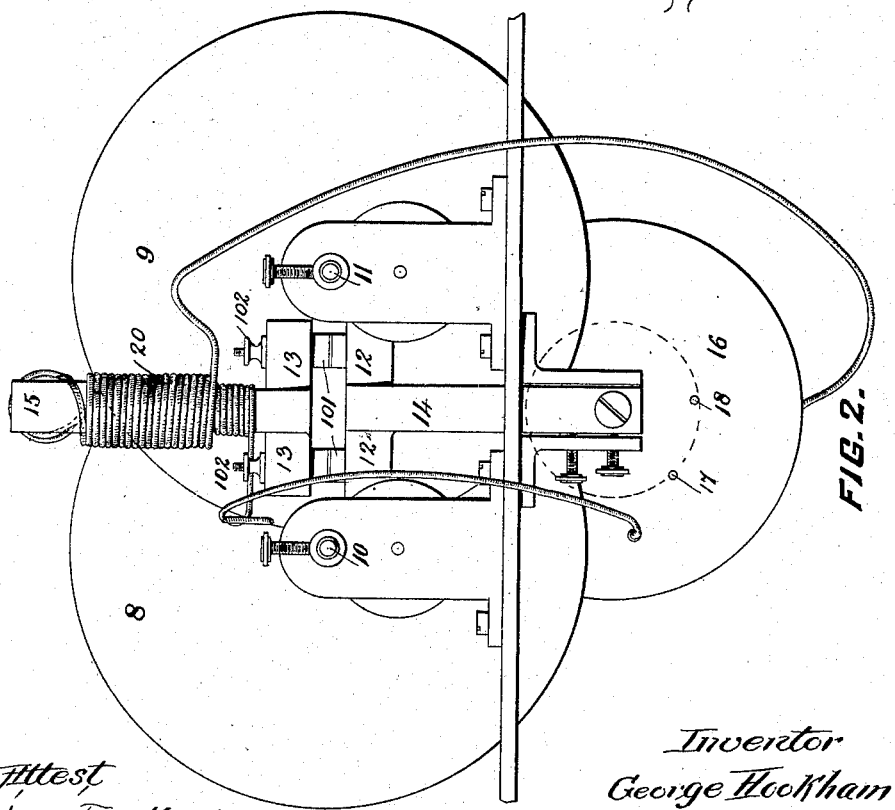
Figure 7:
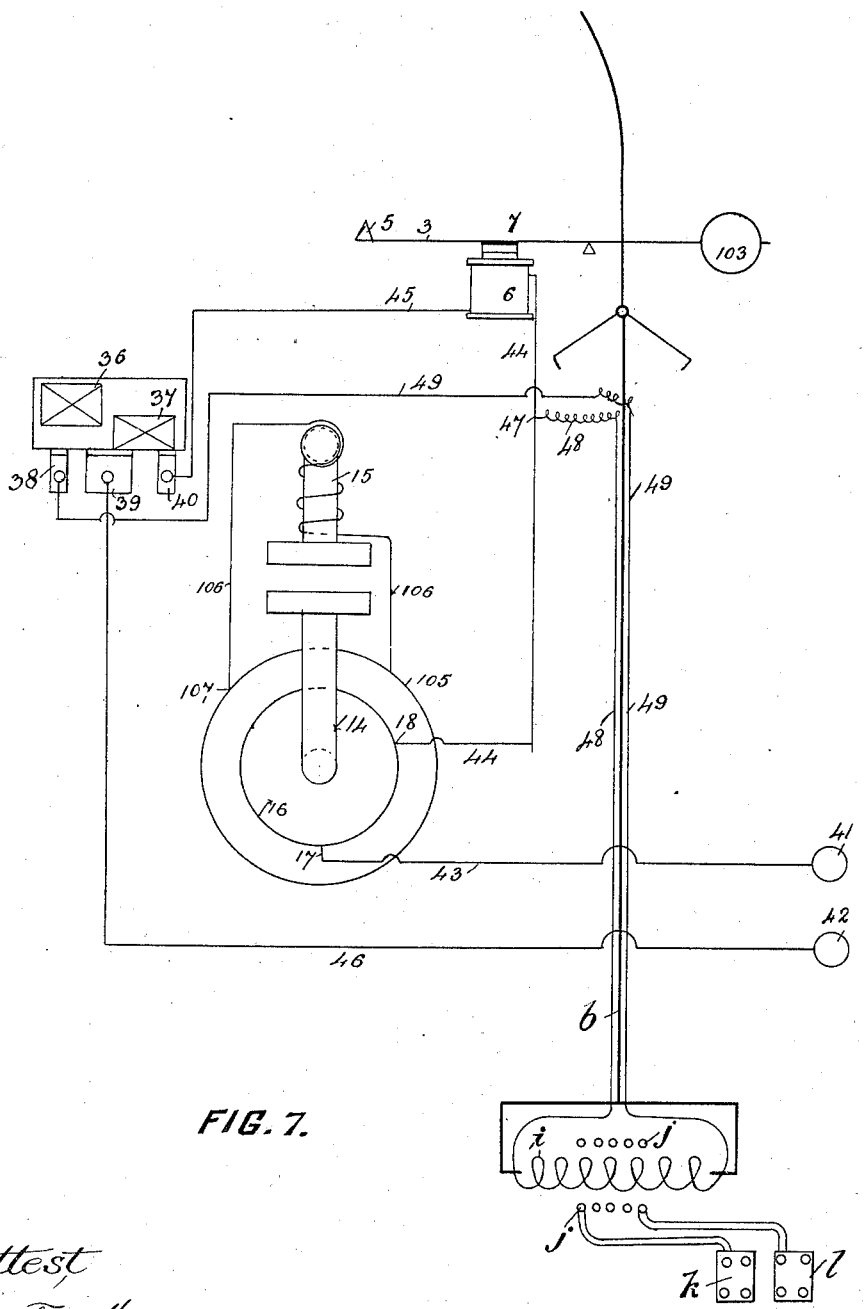
Figure 8:
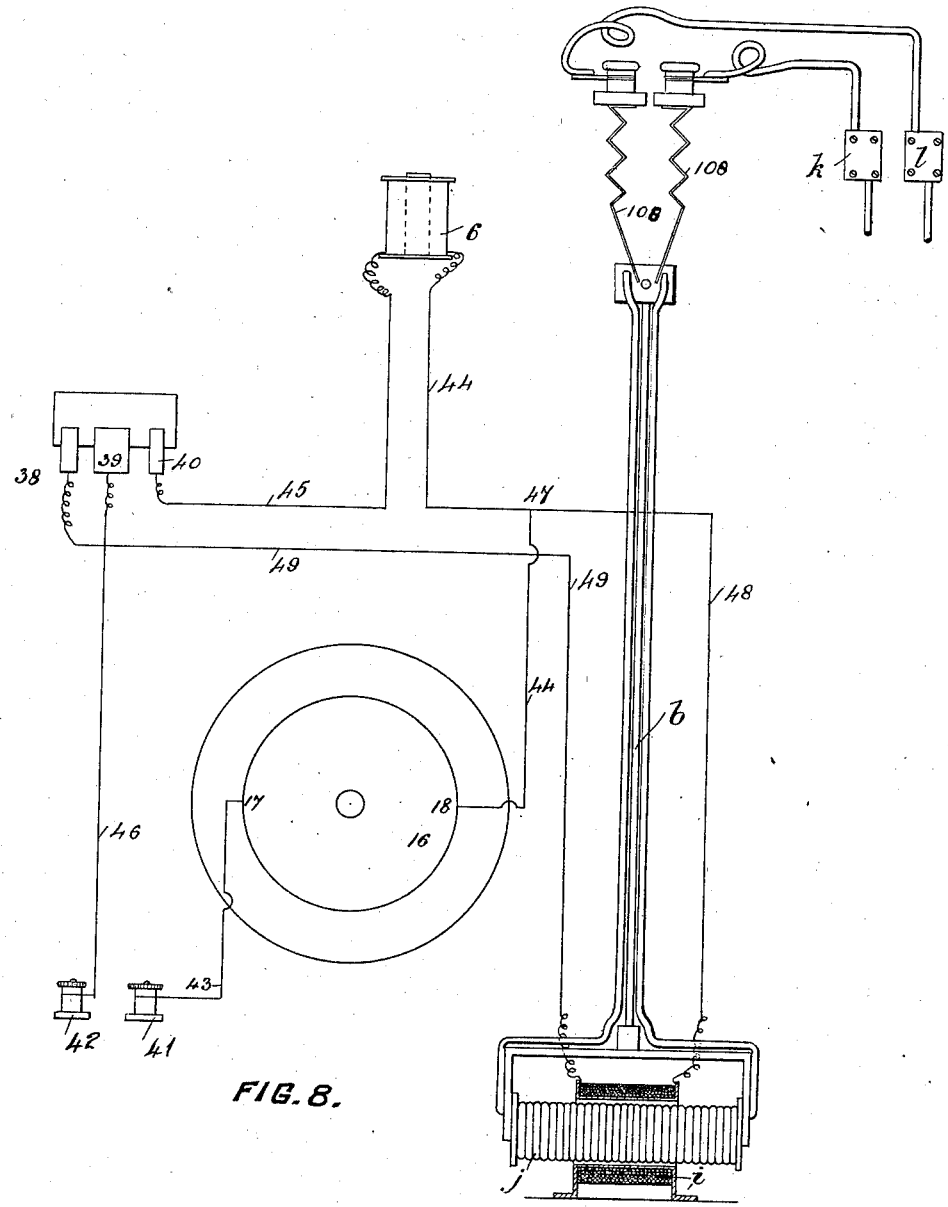

Referring now to the accompanying five sheets of drawings, which illustrate meters in accordance with my invention, Figure 1 is a front elevation of an alternating-current meter having the motor and front plate removed to show the clockwork. Fig. 2 is a front and Fig. 3 a side elevation of the motor which I prefer to use in alternating-current meters. Fig. 4 is a plan view of the whole meter, including both motor and clockwork. Fig. 5 is a side elevation, and Fig. 6 an end elevation, on an enlarged scale, of a switching device adapted to effect the switching in and out of the shunt-coil at periodic intervals and also to bring the synchronizing device into and out of operation. Fig. 7 is a diagram of the electric circuits of the meter shown in the previous figures. Fig. 8 is a diagrammatic view showing a modified form of meter in which the shunt-coil is fixed to the meter-case and the series coil is carried by the pendulum-bob.

According to my invention as illustrated in the first six figures of the drawings I arrange two pendulums $a$ and $b$, $a$ being a free pendulum, and $b$ a pendulum controlled by the current to be measured. The pendulums are supported on pivots or knife-edges $c$. Pendulum $a$ is not affected under any conditions by the current, while pendulum $b$ carries a shunt-coil $i$, which is acted on by a fixed series coil $j$, whose terminals are shown at $k$ and $l$. These coils may be arranged to affect one another in any well-known manner—for example, the series coil $j$ may be placed with its axis vertical, in which case the coil $i$, carried on the pendulum $b$, would be similarly disposed with its axis vertical and would swing closely over the fixed coil $j$. Each pendulum carries an escapement-pawl $m$, whereby it is driven by means of an escapement-wheel $n$, spring $o$, and gear-wheel $p$. (See plan Fig. 4.) These gear-wheels $p$ each operate one of the spur-wheels $r$ of the differential gear-train. The wheels $r$ each carry crown-wheels $s$, which both gear with a common pinion $t$, carried loose on a staff $u$, fixed on the axle $v$. This axle $v$ carries an aluminium disk $w$, on which rests a similar disk $h$, fixed on a spindle 2. The disk $h$ has its spindle 2 guided in a vertical plane. When in its lowest position, disk $h$ rests on and is rotated by disk $w$. On spindle 2 is provided the synchronizing-beam $e$, which carries the very light and nearly close spiral springs $f$, which are shown exaggerated in diameter in the drawings for the sake of clearness. The upward projections $d$ on the pendulums are formed with edges struck from the center of oscillation of the beam $e$. A further disk $g$ is provided on the axis 2, and a lever-arm 3, pivoted at 4, has a knife-edge block 5, which is pressed against the edge of the disk $g$. The weight of the balance-weight 103 is such that the lever 3, by means of knife-edge 5 acting on the edge of disk $g$, holds up the spindle 2 with its disk $h$ clear of the disk $w$, which is not then driven. The lifting device holds the spindle 2 from rotation, as well as takes it out of gear with the disk $w$, thus fixing the beam $e$ in position. When the accelerated or retarded pendulum is not being affected by the current to be measured, the coil 6 is energized, and it pulls down the lever 3 by the armature 7, thus setting the beam $e$ free to be rotated by the differential gear into a position such as is shown in dotted lines in Fig. 1 to correct want of synchronism of the pendulums. The beam $e$, carried on the spindle 2, has the two fine spiral springs $f$, supported one at each end. These spirals are closely coiled and of such length that they offer a very small resisting force to deflection. They therefore slightly accelerate the vibration of the pendulums $a$ and $b$, whose extensions $d$ strike against and bend the coils $f$ at each vibration. When the beam is horizontal, the pendulums are in perfect synchronism if the periods of vibration of the two are the same and the springs $f$ also are of equal strength. If these be not quite the same, the beam $e$ will take up some other position at which the pendulums are in perfect synchronism.

Figure 3:
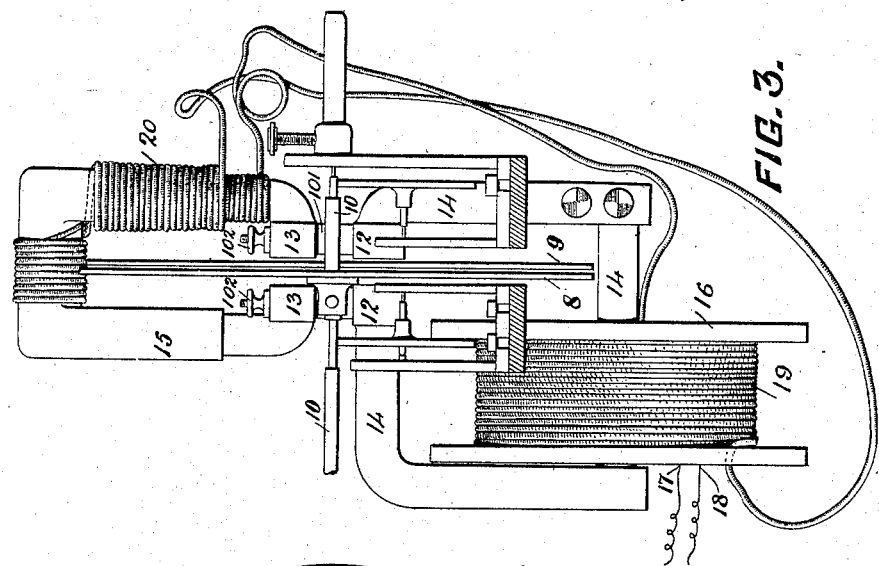

I provide the motor shown in plan in Fig. 4 and in separate elevations in Figs. 2 and 3 to supply driving force to the clocks and also to act as a timekeeper. This motor has two copper disks carried on suitable bearings by spindles 10 and 11, respectively. These disks overlap between the pole-pieces 12 and 13 of the two magnets 14 and 15. These pole-pieces 12 and magnet 15 are supported by non-magnetic distance-pieces 101 and screws 102. The magnet 14 has a shunt winding or coil on the bobbin 16. The ends of this shunt-coil 16 are indicated at 17 and 18, Figs. 1 and 2. Over the shunt-coil 16 is placed a secondary winding or coil 19, which is continuous and forms a closed circuit with windings 20 on the magnet 15. These two magnetic fields produce interacting eddy-currents in each of the disks 8 and 9, which cause them to rotate in opposite directions, thus driving the pendulums through the pinions 21 and 22 on the motor-spindles 10 and 11. These pinions gear directly with the large toothed wheels $p$.

I use a switching device, one form of which is illustrated in Figs. 5 and 6, to switch off the current to be measured from the shunt-coil $i$ and switch in the synchronizing-gear at the proper periodic times for synchronization of the pendulum. In the form of switching device illustrated a pinion 23 is fixed on the gear-wheel spindle of the unaffected pendulum $a$. This gears with a large toothed wheel 24, on whose axle is fixed a disk 25, carrying pins 26 27. The disk 25 rotates in the direction shown by the arrow 28 and between the pins 29 and 30 on a disk 31. The disk 31 is fixed to the axle of a cylindrical plug tumbler-switch 32, carried in bearings 33. On the other end of the axle of the tumbler-switch 32 a lever 34 is fixed, carrying a tumbling-weight 35. The axis of the tumbler-switch and its disk 31 is above the level of the axis of the disk 25, so that the pins 26 27 may clear the pins 29 and 30 in their highest positions. The cylindrical plug-switch is of insulating material, having contact-pieces 36 and 37 let into the surface at the proper points, on which bear spring contact-pieces 38, 39, and 40. The disk 25 and its pins must be geared so as to make a complete revolution in each four minutes if the tumbler-switch is to be operated at periodic intervals of two minutes. When the pin 26, say, comes into engagement with the pin 29, it gradually lifts the latter until the tumbler-weight passes over the center, when it falls over and changes the electrical connections of the meter.

In Fig. 7 is shown diagrammatically the electric circuits within the meter. The arrangement is the same as in Fig. 1, except that in the latter figure the secondary circuit of the motor is omitted for the sake of clearness. The series current enters by terminal $k$ and passing through the series coil $j$ leaves by terminal $l$. In Figs. 1 and 7 the circuits are shown in the position when the pendulum is not affected by the current to be measured—that is, when there is no current through coil $i$. The shunt-current then passes into the meter by the terminal 41, thence by wire 43 through the motor shunt-coil 16, entering at 17 and leaving at end 18. It then passes, by the wire 44, to the coil 6, from which, by the wire 45, it passes to the tumbler-switch terminal 40. Here the contact-piece 37 connects with the common return-terminal 39, which in turn connects with wire 46, conveying the current to the second shunt-terminal 42. The secondary circuit of the shunt magnet-coil 16 is indicated at 105. This circuit is closed through the wire 106, passing around the upper magnet 15 and back to the coil at 107. When the synchronizing period of, say, two minutes has elapsed, the tumbler-switch changes the shunt connections, putting in the pendulum shunt-coil $i$ and taking out the coil 6. This then releases its armature 7, which is overbalanced by the counterweight 103. The lever-arm 3 then by means of its knife-edge block lifts up the disk $g$, and thereby the beam $e$, which is thus held in the angular position determined by the last synchronizing operation. The pivots 2 of the beam $e$ are provided with vertical guides, as shown at 108, Fig. 1. When reversal of the electrical connections has taken place by means of the tumbler-switch, the shunt-current flows, as before, through the shunt magnet-coil 16 and thence, by the wire 44, to the point 47, where a branch wire 48 passes off to the pendulum shunt-coil $i$, whence it passes, by way of the wire 49, to the terminal 38 and then through the contact-piece 36 and wire 46 to the second shunt-terminal 42. The pendulum $b$ is now affected by the current to be metered, and a record takes place on the index 104, connected with the spindle $v$ of the differential gear. At the end of the next two minutes reversal of the circuit connections again takes place, the pendulum $b$ being again unaffected and the electromagnet 6 energized. The disk $h$ is thus again lowered, and any difference in the rates of the two pendulums will cause the differential gear to rotate, carrying with it the disk $w$. This disk $w$ thus drives the disk $h$ and with it the beam $e$, which carries the springs $f$ into a position in which they correct the error of synchronism by accelerating the slow pendulum and slowing up the pendulum which is beating too fast. I find that by this means the want of synchronism between the pendulums can be corrected for the purposes of an electricity-meter. For the sake of preventing sparking I prefer to arrange the contact-pieces 36 and 37 to overlap, so that the two coils $i$ and 6, which may be of nearly the same resistance, will be for a very short interval in parallel with one another. The shunt-circuit is therefore never broken in the operation of the meter, and the coil 16 is always in circuit. I may in some cases arrange the motor shunt-coil 16 on a separate circuit which is then not connected with the tumbler-switch.

In Fig. 8 I have shown an arrangement of meter in which the series coil is carried on the pendulum $b$ and the shunt-coil $i$ is fixed. With this arrangement the meter becomes independent of the earth's magnetic field and within the limits of its range for all external magnetic influences. In this form of meter I use thin flat copper bands 108 of zigzag form and of suitable length to lead in the current to the coil on the moving pendulum $b$. I also cause these to be fixed to a point very near to the pendulum-pivot, so that an exceedingly-small motion of the connecting-bands 108 will be required. In all other respects the arrangements shown in Fig. 8 correspond with that in Figs. 1 to 7.

Having now described my invention, what I claim as new, and desire to secure by Letters Patent, is—

1. In electricity-meters in which two pendulums are compared, one being affected at periodic intervals by the current to be measured and the other beating normal time, a synchronizing device consisting of a balance-gear adapted to correct deviations from synchronism between the pendulums during alternate periods in which both pendulums are unaffected by the current or energy to be measured.

2. In electricity-meters, in combination, two pendulums, one affected, by the current or energy to be measured, the other unaffected and acting as a timekeeper, a driving-motor, switching means operated by the time-keeping pendulum at periodic intervals, and synchronizing means brought into operation at periods alternating with periods during which the current or energy affects one of the pendulums substantially as described.

3. In two-pendulum electricity-meters, a synchronizing device, consisting of a beam carrying springs, against which projections on the pendulums vibrate, and whose angular position is controlled at periodic intervals from the differential gear connecting the pendulums, for the purpose of automatically effecting an acceleration of the slow pendulum, and a retardation of the fast one, till synchronism is obtained substantially as described.

4. In electricity-meters in combination two pendulums one unaffected and acting as a timekeeper the other carrying a coil through which the series current passes, a driving-motor, switching means operated by the time-keeping pendulum at periodic intervals, and synchronizing means brought into operation at periods alternating with periods during which the current or energy affects one of the pendulums substantially as described.

In witness whereof I have hereunto set my hand in presence of two witnesses.

GEORGE HOOKHAM.

Witnesses:
   FREDERICK JOHN EDWARDS,
   HERBERT BOWKETT.